(12) United States Patent
Andersson et al.

(10) Patent No.: US 10,791,552 B2
(45) Date of Patent: Sep. 29, 2020

(54) METHODS AND APPARATUSES FOR HANDLING OF SOFT BUFFERS

(71) Applicant: Telefonaktiebolaget LM Ericsson (publ), Stockholm (SE)

(72) Inventors: Mattias Andersson, Sundbyberg (SE); Daniel Larsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/079,243

(22) PCT Filed: Apr. 3, 2017

(86) PCT No.: PCT/SE2017/050328
§ 371 (c)(1),
(2) Date: Aug. 23, 2018

(87) PCT Pub. No.: WO2017/171629
PCT Pub. Date: Oct. 5, 2017

(65) Prior Publication Data
US 2019/0053230 A1 Feb. 14, 2019

Related U.S. Application Data (60) Provisional application No. 62/316,930, filed on Apr. 1, 2016.

(51) Int. Cl.
 *H04W 72/04* (2009.01)
 *H04L 1/18* (2006.01)
(52) U.S. Cl.
 CPC ....... *H04W 72/0446* (2013.01); *H04L 1/1822* (2013.01); *H04L 1/1835* (2013.01);
 (Continued)

(58) Field of Classification Search
 CPC ............ H04W 72/0446; H04W 72/042; H04L 1/1835; H04L 1/1822; H04L 1/1887; H04L 1/1819
 See application file for complete search history.

(56) References Cited

U.S. PATENT DOCUMENTS

2010/0322197 A1* 12/2010 Adjakple ............ H04W 36/023
                                                        370/332
2013/0051289 A1   2/2013 Hsieh et al.
(Continued)

FOREIGN PATENT DOCUMENTS

EP    2713541 A2   4/2014
WO    0230000 A2   4/2002
(Continued)

OTHER PUBLICATIONS

Unknown, Author, "Design of DL DCI for short TTI", 3GPP TSG RAN WG1 Meeting #84, R1-160931, Ericsson, Feb. 15-19, 2016, 1-5.

*Primary Examiner* — Gregory B Sefcheck
*Assistant Examiner* — Joshua Smith
(74) *Attorney, Agent, or Firm* — Murphy, Bilak & Homiller, PLLC (57) ABSTRACT

There is disclosed a method for adapting HARQ buffers in a wireless device (90), said device is adapted for HARQ communication, the method comprising determining (10) a size of a HARQ buffer, the HARQ buffer size being based on a TTI. There is also disclosed a wireless device (90) adapted for HARQ communication, the wireless device comprising a processing circuitry and a memory, said memory containing instructions executable by said processing circuitry, whereby said wireless device is operative to determine a size of a HARQ buffer, the HARQ buffer size being based on a TTI.

8 Claims, 5 Drawing Sheets

(52) U.S. Cl.
    CPC ......... *H04L 1/1887* (2013.01); *H04W 72/042* (2013.01); *H04L 1/1819* (2013.01)

(56) References Cited

U.S. PATENT DOCUMENTS

| | | | | |
|---|---|---|---|---|
| 2014/0022924 A1* | 1/2014 | Cili | ................. | H04W 24/08 |
| | | | | 370/252 |
| 2014/0098761 A1* | 4/2014 | Lee | ................. | H04W 74/006 |
| | | | | 370/329 |
| 2014/0185530 A1* | 7/2014 | Kuchibhotla | ......... | H04W 76/14 |
| | | | | 370/329 |
| 2014/0233391 A1* | 8/2014 | Reider | .............. | H04W 52/0212 |
| | | | | 370/236 |
| 2016/0088635 A1* | 3/2016 | Davydov | .............. | H04L 1/1812 |
| | | | | 370/329 |
| 2016/0204907 A1 | 7/2016 | Chen et al. | | |
| 2016/0295584 A1* | 10/2016 | Chen | ................. | H04W 72/0446 |

FOREIGN PATENT DOCUMENTS

| WO | 2016040290 A1 | 3/2016 |
|---|---|---|
| WO | 2016160330 A1 | 10/2016 |

\* cited by examiner

| SB0 | SB1 | SB2 | SB3 | SB4 | SB5 | SB6 | SB7 |

Fig. 3

| SB0a | SB1a | SB2a | SB3a | SB4a | SB5a | SB6a | SB7a |
| SB0b | SB1b | SB2b | SB3b | SB4b | SB5b | SB6b | SB7b |

Fig. 4

| SSB0 | SSB1 | SSB2 | SSB3 | SB1 | SB2 | SB3 | SB4 | SB5 | SB6 | SB7 |

Fig. 5

| SSB(0,0) | SSB(1,0) | SSB(2,0) | SSB(3,0) | SB1 | SSB(0,2) | SSB(1,2) | SB3 | SB4 | SB5 | SB6 | SB7 |

Fig. 6

| SSB0b | SSB1b | SSB2b | SSB3b | | | | | | | |
| SSB0a | SSB1a | SSB2a | SSB3a | SB1 | SB2 | SB3 | SB4 | SB5 | SB6 | SB7 |

METHODS AND APPARATUSES FOR HANDLING OF SOFT BUFFERS

TECHNICAL FIELD

Embodiments herein relate to wireless telecommunications and or data communications in general and in particular to methods and apparatuses for handling of soft buffers with in wireless communication.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS.

In LTE, Hybrid Automatic Repeat request (HARQ) is used. HARQ is a combination of high-rate forward error-correcting coding and ARQ error-control. In standard ARQ, redundant bits (e.g. parity bits) are added to data to be transmitted using an error-detecting (ED) code such as a cyclic redundancy check (CRC). Data together with redundant bits may be called a packet or a data packet. A data packet may comprise data without redundant bits or a data packet may comprise redundant bits without data or any combination with data and/or redundant bits. Receivers detecting a corrupt data packet will request a re-transmission of the data packet from the sender. In Hybrid ARQ, the original data is encoded with a forward error correction (FEC) code, and redundant bits (e.g. parity bits) are either immediately sent along with the data packet or only transmitted upon request when a receiver detects an erroneous data packet. The ED code may be omitted when a code is used that can perform both forward error correction (FEC) in addition to error detection, such as a Reed-Solomon code. The FEC code is chosen to correct an expected subset of all errors that may occur (by using e.g. parity bits), while the ARQ method is used as a fall-back to correct errors that are uncorrectable using only the redundancy sent in the initial transmission. As a result, hybrid ARQ performs better than ordinary ARQ in poor signal conditions, but in its simplest form this comes at the expense of significantly lower throughput in good signal conditions. There is typically a signal quality cross-over point below which simple hybrid ARQ is better, and above which basic ARQ is better.

In a more sophisticated form of HARQ, the sender of data packets alternates between including data bits along with error detecting parity bits in the data packet and/or only FEC parity bits included in the data packet. When the first transmission of a data packet is received error free, the FEC parity bits are never sent. Also, two consecutive transmissions of data packets can be combined for error correction if neither of the data packets is error free.

One technique to accomplish the combining of consecutive transmissions of data packets, is to store incorrectly received data packets, rather than discard those data packets, and when a re-transmitted data packet is received, the data packets are combined. This is called Hybrid ARQ with soft combining. While it is possible that two given transmissions of data packets cannot be independently decoded without error, it may happen that the combination of the previously erroneously received data packet gives enough information to correctly decode the transmitted data packet.

One particular implementation of HARQ with soft combining is incremental redundancy (IR). In IR, every re-transmission of a data packet contains different information than the previous one. Multiple sets of coded bits are generated, each representing the same set of data and/or information bits. The re-transmission typically uses a different set of coded bits than the previous transmission, with different redundancy versions generated by puncturing the encoder output. Thus, at every re-transmission the receiver gains extra information which increases the probability of successfully decoding the data packet.

Another technique to implement HARQ with soft combining is chase combining, in which every re-transmission contains the same data packet (data and parity bits). The receiver uses maximum-ratio combining to combine the received bits with the same bits from previous transmissions. Because all transmissions are identical, Chase combining can be seen as additional repetition coding. One could think of every re-transmission as adding extra energy to the received transmission.

In LTE, HARQ with incremental redundancy is used. Instead of re-transmitting the same portion of the code word, different redundancy versions are re-transmitted yielding an extra gain over Chase combining.

Recently in 3GPP, discussions related to a variable Transmission Time Interval (TTI) have been initiated. When using e.g. shorter TTIs, the data packets may become smaller and due to different HARQ timing caused by different TTIs, the number of HARQ processes for short TTIs can become larger than for the current TTI. A User Equipment (UE) may also need to store data corresponding to TTIs of different lengths, in the buffer (e.g. soft buffer) at the same time, and also switch between different TTI lengths dynamically, which will increase complexity and cost at the UE if the operation of HARQ processes with different TTIs, is not designed for efficient operation.

SUMMARY

It is an object of embodiments described herein to address at least some of the problems and issues outlined above. It is possible to achieve this object and others by using methods and apparatuses, such as wireless devices, as defined in the attached independent claims.

In a first aspect, there is disclosed a method in a wireless device adapted for HARQ communication, the method comprising determining a HARQ buffer size of a HARQ buffer, the HARQ buffer size being based on a TTI. The method may further comprise receiving a data packet from a radio network node, wherein the data packet was transmitted during the TTI. The method may further comprise allocating the HARQ buffer for a HARQ process associated with the data packet.

In a second aspect a wireless device adapted for HARQ communication, is disclosed. The wireless device comprises a processor and a memory, said memory containing instructions executable by said processor whereby said wireless device is operative to determine a size of a HARQ buffer, the HARQ buffer size being based on a TTI. The wireless device may be further operative to receive a data packet from an radio network node, wherein the data packet was transmitted during the TTI. The wireless device may be further operative to allocate the HARQ buffer for a HARQ process associated with the data packet.

In a third aspect, there is disclosed a method for operating a radio network node adapted for transmission of a data packet using HARQ communication, the method comprising transmitting a data packet using HARQ communication, and transmitting an indication of a Transmission Time Interval, TTI, to a wireless device, said TTI being associated with the data packet.

In a fourth aspect there is disclosed a radio network node adapted for HARQ communication, the radio network node comprising a processing circuitry and a memory, said memory containing instructions executable by said processing circuitry whereby said wireless device is operative to transmit a data packet using HARQ communication and transmit an indication of a Transmission Time Interval, TTI, to a wireless device, said TTI being associated with the data packet.

The above wireless devices and methods therein may be implemented and configured according to different optional embodiments to accomplish further features and benefits, to be described below.

Some of the advantages achieved by the methods and wireless devices is that the HARQ buffers used in a receiver in a HARQ communication, can be efficiently used and therefore reduce the cost and/or complexity of the wireless device when introducing varying and/or shorter TTI and therefore reduce latency and thereby improve performance in communication systems that are using HARQ communication.

BRIEF DESCRIPTION OF DRAWINGS

The solution will now be described in more detail by means of exemplary embodiments and with reference to the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. Also, descriptions of well-known functions and constructions are omitted for clarity and conciseness. Accordingly, it should be apparent to those skilled in the art that the following description of exemplary embodiments of the present invention are provided for illustration purpose only and not for the purpose of limiting the invention as defined by the appended claims and their equivalents. It is to be understood that the singular forms "a," "an," and "the" include plural referents unless the context clearly dictates otherwise. Thus, for example, reference to "a component surface" includes reference to one or more of such surfaces.

It is an object of the present disclosure to provide examples for adapting HARQ buffers in a wireless network and thereby enabling efficient dynamic handling of HARQ processes and their associated HARQ buffers with limited impact on UE complexity and/or cost with respect to buffer sizes and related memory in the UE.

As used herein, the non-limiting terms "wireless device", "User Equipment, UE" and "terminal" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like.

As used herein, the non-limiting term "wireless device" may also refer to base stations, network control nodes such as network controllers, radio network controllers, base station controllers, and the like. In particular, the term "base station" may encompass different types of radio base stations including standardized base stations such as Node Bs, or evolved Node Bs, eNBs, for LTE.

It shall be mentioned that a wireless device may be an implementation of a UE or a terminal or a base station such as an eNB.

In the present disclosure, the non-limiting term "wireless network" may refer to any radio communication networks, in particular UTRA for WCDMA or eUTRA for LTE, but any other wireless communications system such as WiFi and WiMax can be anticipated.

A data packet may refer to a transport block (TB) as defined in 3GPP and may comprise data bits (e.g. information bits) and/or error correction bits and/or error detection bits and/or parity bits. Error correction bits and/or error detection bits may be examples of parity bits. A MAC SDU may be an example of data bits and/or information bits. A data packet may also comprise one or several codewords, depending on the available size of the data packet and/or TB. A data packet may comprise coded bits. Coded bits may be e.g. information bits and/or parity bits (e.g. error correction bits).

A codeword may comprise information and/or data bits with- or without parity bits.

The size of a TB and/or a data packet may depend on the TTI.

In general, a TTI represents a time interval, which may have a length and/or size, which may be measured in time units such as seconds, fraction of a second, slots, symbols. A TTI may be variable in length and/or size and may pertain to e.g. a radio frame and/or parts of a radio frame (e.g. a subframe) and/or parts of a subframe (e.g. slots and/or symbols).

As stated above, in LTE, HARQ with incremental redundancy is used. Instead of re-transmitting the same portion of a data packet and/or codeword, different redundancy versions are re-transmitted yielding an extra gain over Chase combining.

Ideally, a full soft buffer should be available at a receiver side such that a received data packet can be stored. However, due to the complexity of a terminal and related cost concerns, the soft buffer size in a terminal is limited. For higher rate transmissions (where larger data packets are sent from the transmitter), the UE may have only a limited soft buffer size and may not be able to store the complete data packet. Therefore, the sender of the data packet (e.g. an evolved Node B or eNB) and the receiver (e.g. the terminal) should have the same understanding about the soft buffer size. Otherwise the eNB may transmit data packets that the UE may not completely store. Alternatively, the UE may store the data packet by replacing already stored bits in the soft buffer which may lead to discard of previously received, but still not decoded data packets. This will likely cause unnecessary retransmissions which will deteriorate the performance.

Figure 1:
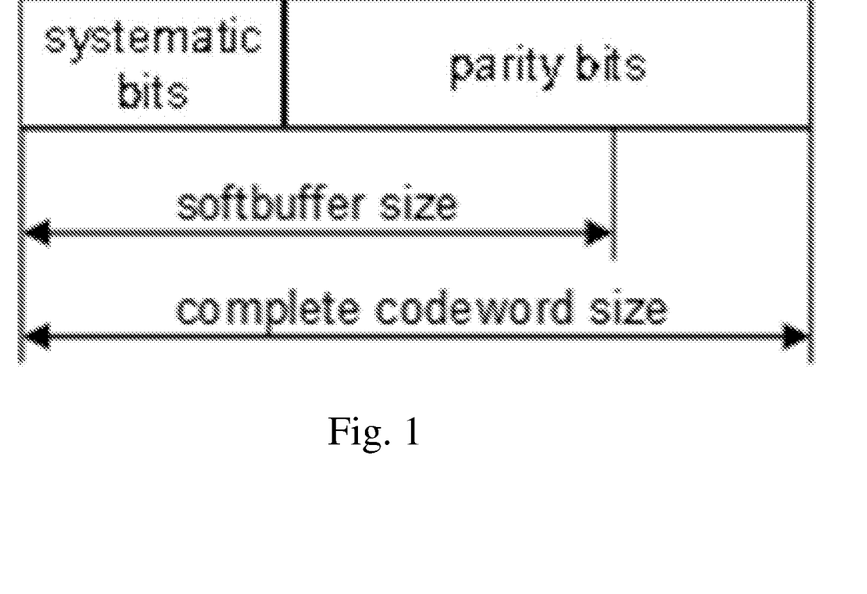
FIG. 1 illustrates encoded transport block and coded bits stored by terminal (softbuffer size or HARQ buffer size)
Figure 2:
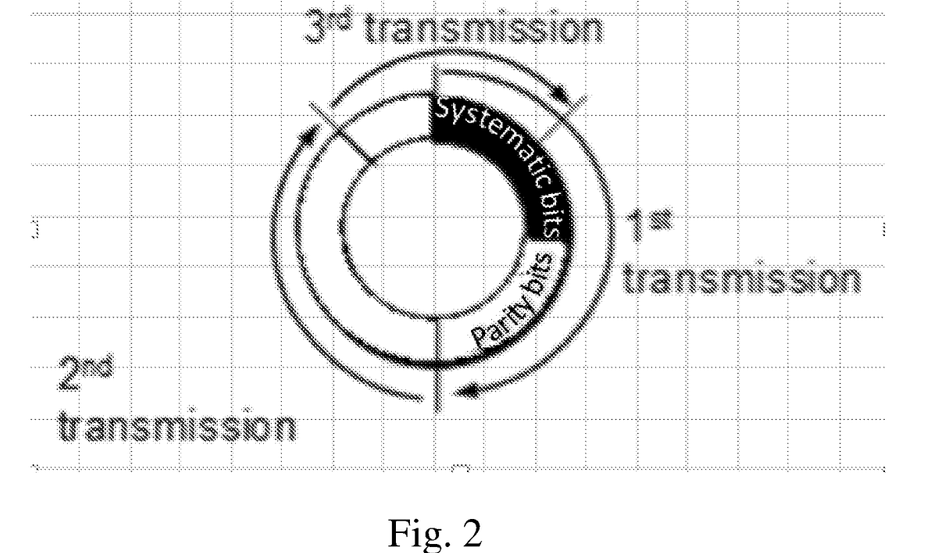
FIG. 2 illustrates an example of how bits used in a first transmission and re-transmissions are derived from a circular buffer. The size of the circular buffer matches the softbuffer size (or HARQ buffer size) of the terminal.

FIG. 1 illustrates a scenario when a received data packet, comprising one codeword which in turn comprises systematic bits (such as data bits and/or information bits) and parity bits (e.g. error correction bits). The received data packet does not fit into the remaining soft buffer size allocated for the related HARQ process. This scenario may be avoided if a sender (e.g. an eNB) of data packets and a receiver (e.g. a terminal) of data packets have a same understanding about the soft buffer size in the receiver. E.g. the sender of a data packet may control the size of the data packet and avoid sending data packets which are too large to fit into the remaining soft buffer related to the HARQ process of the data packet. This is illustrated in FIG. 2, where the sender of data packets only uses the bits and/or coded bits, which are stored by the terminal transmits Alternatively, it (the sender such as e.g. an eNB) only takes those coded bits that are stored by the terminal (e.g. a UE) and uses those bits for (re-)transmissions. This can be depicted by the circular buffer shown in FIG. 2. It is important to note that the complete circle corresponds to the softbuffer size and not to the entire codeword. In the first transmission, depending on the code rate, some/all systematic bits and none/some parity bits are transmitted. In a retransmission the starting position is changed and bits corresponding to another part of the circumference are transmitted.

In Rel-8 LTE FDD, each terminal has up to 8 HARQ processes per component carrier and each HARQ process can contain up to two sub-processes for supporting dual-codeword MIMO transmissions. The design in Rel-8 LTE is to divide the available soft buffer equally into the configured number of HARQ processes. Each of the divided soft buffers can be used to store soft values of the received codewords. In case of dual-codeword MIMO transmission, the divided soft buffer shall be further divided equally to store the soft values of the two received codewords. A soft value may pertain to the confidence of a received value. E.g. a soft value may indicate the probability of a value being correctly received.

More specifically, in 3GPP Technical Specification 36.212, Section 5.1.4.1.2 "Bit collection, selection and transmission", the soft buffer size allocation is provisioned as below:

"The circular buffer of length $K_w=3K_\pi$ for the r-th coded block is generated as follows:

$$w_k = v_k^{(0)} \text{ for } k=0,\ldots,K_\pi-1$$

$$w_{K_\pi+2k} = v_k^{(1)} \text{ for } k=0,\ldots,K_\pi-1$$

$$w_{K_\pi+2k+1} = v_k^{(2)} \text{ for } k=0,\ldots,K_\pi-1$$

Denote the soft buffer size for the transport block by $N_{IR}$ bits and the soft buffer size for the r-th code block by $N_{cb}$ bits. The size $N_{cb}$ is obtained as follows, where C is the number of code blocks computed in section 5.1.2:

$$N_{cb} = \min\left(\left\lfloor \frac{N_{IR}}{C} \right\rfloor, K_w\right)$$

for downlink turbo coded transport channels
$N_{cb}=K_w$ for uplink turbo coded transport channels
where $N_{IR}$ is equal to:

$$N_{IR} = \left\lfloor \frac{N_{soft}}{K_{MIMO} \cdot \min(M_{DL\_HARQ}, M_{limit})} \right\rfloor$$

where:

$N_{soft}$ is the total number of soft channel bits [4].

$K_{MIMO}$ is equal to 2 if the UE is configured to receive PDSCH transmissions based on transmission modes 3, 4 or 8 as defined in section 7.1 of [3], 1 otherwise.

$M_{DL\_HARQ}$ is the maximum number of DL HARQ processes as defined in section 7 of [3].

$M_{limit}$ is a constant equal to 8.

Figure 3:
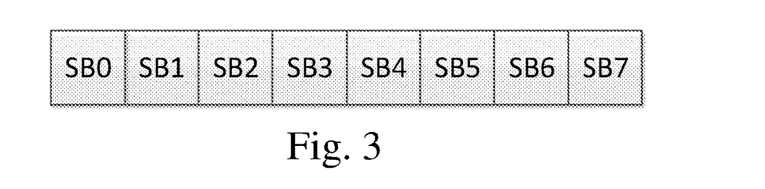
FIG. 3 illustrates a soft buffer (HARQ buffer) allocation in Rel-8 LTE when the PDSCH transmission mode is other than mode 3, 4 or 8.
Figure 4:
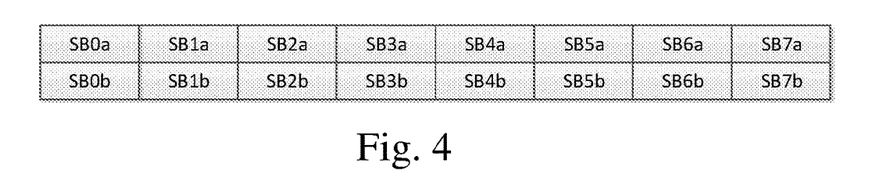
FIG. 4 illustrates a soft buffer (HARQ buffer) allocation in Rel-8 LTE when the PDSCH transmission mode is mode 3, 4 or 8.

The soft buffer allocation for the single-codeword transmission modes is illustrated in FIG. 3. It can be observed that there is a buffer reserved for each codeword. The soft buffer allocation for the dual-codeword transmission modes is illustrated in FIG. 4. It can be observed that the buffer reserved for each codeword is only half of the previous operating case. It is clear that the soft buffer size is limited in case of dual codeword compared to the case of single codeword. This limitation reduces the effectiveness of soft combining gains from incremental redundancy retransmissions.

Latency Reductions and Short TTIs

Packet data latency is one of the performance metrics that vendors, operators and also end-users (via speed test applications) regularly measures. Latency measurements are done in all phases of a radio access network system lifetime, when verifying a new software release or system component, when deploying a system and when the system is in commercial operation.

One area to address when it comes to packet latency reductions is the reduction of transport time of data and control signaling (by addressing the length of a TTI) and the reduction of processing time of control signaling (e.g. the time it takes for a UE to process a grant signal).

UE Receiver Processing

Since the time needed for turbo decoding depends on the code block size, latency can be reduced by reducing the codeblock size. Hence, if the code block size (or e.g. the transport block size (TBS)) or data packet size) is reduced, the decoding result will be available earlier (for a given decoding capability in terms of number of parallel decoders). If instead of transmitting a single large code block of length 6000 bits once every 1 ms, transmitting two consecutives blocks of length 3000 bits every 0.5 ms, one may roughly, to first order, half the decoding latency for each block while still maintaining the bit rate at roughly the same complexity. It should be noted that some performance degradations may be expected, e.g. due to shorter block length, and it is in general expected to be tradeoff between latency and receiver performance (but not necessarily system or end user performance).

"Sub-Subframes"

From the discussion above on terminal receiver processing it follows that there is an opportunity to reduce the latency for terminal receiver processing by having PDSCH assignments not only covering all OFDM symbols in a 1 ms subframe, but also to have PDSCH assignments with shorter durations covering a lower number of consecutive OFDM symbols. The duration of the assignment can vary from subframe to subframe. As mentioned above, the reduction in TTI length also comes with a reduction in TBS and/or reduction of data packet size. The TBS and/or data packet size may be measured in number of bits.

When using shorter TTIs, the TBS and/or packet data size becomes smaller in size, and due to different HARQ timing the number of HARQ processes for short TTIs can become larger than in current LTE. A UE may also need to store data corresponding to TTIs of different lengths in the buffer at the same time, and also switch between different TTI lengths dynamically.

A total soft buffer in a receiver (e.g. a UE) is divided among the number of HARQ processes into distinct buffers or into defined soft buffer allocations. According to embodiments herein, when a sender transmits using shorter TTIs, one or more of the defined soft buffers (HARQ buffers) are, or may be, divided into smaller buffers, e.g. sub-HARQ buffers, where the size of each sub-HARQ buffer depends on the TTI length. The different HARQ buffers and/or sub-HARQ buffers may also be allocated to different parts of the total soft buffer (or total HARQ buffer).

The total soft buffer (or total HARQ buffer) in a wireless device in this disclosure may be a dedicated physical memory and/or a dedicated allocation of an amount of memory reserved for buffering data associated with HARQ processes. The total soft buffer may also be called the total HARQ buffer. FIG. 3 -FIG. 7 depicts different partitions and/or allocations and/or reservations of HARQ buffers within the total HARQ buffer.

In the description below, HARQ process numbers corresponding to short TTIs are different from the HARQ process number corresponding to long TTIs (e.g. legacy TTI of 2 ms). As an example, see FIG. 5, which illustrates legacy- or long soft buffer allocations (SB1-SB7) associated with seven legacy- or long HARQ processes (HARQ processes 1-7) and short soft buffer allocations (SSB0-SSB3) associated with four short HARQ processes (short HARQ process 0-3). In this example the soft buffer allocation associated with legacy- or long HARQ process 0, is reserved and/or allocated for associated short HARQ processes 0-3.

A HARQ buffer pertains to a soft buffer associated with a HARQ process. A soft buffer may comprise a size which is measured in bits and may also comprise an identity. Consequently, a HARQ buffer may have a size, which size may be measured in bits. A HARQ buffer may pertain to a legacy- or long or short soft buffer associated with a respective legacy- or long or short HARQ process.

It shall be mentioned that each soft buffer reservation and/or allocation may be associated with a data packet and/or code word and/or transport block (TB). Each data packet and/or code word and/or TB is associated with a HARQ process.

As an example, when a UE receives a data packet, transmitted by an eNodeB, the data packet is associated with a HARQ process for which HARQ process the UE has reserved and/or allocated a subset of the total HARQ buffer. The subset of the total HARQ buffer may be called a HARQ buffer or a legacy- or long or short buffer as indicated above. A HARQ buffer may have a size, which is measured in bits.

A UE may determine a size of a HARQ buffer (e.g. a subset of the total HARQ buffer) to make the size of the HARQ buffer suitable for storing data packets associated with its related and/or associated HARQ process.

In one aspect it is disclosed a method in a wireless device for operating a wireless device adapted for HARQ communication, the method comprising determining a HARQ buffer size of a HARQ buffer, the HARQ buffer size being based on a TTI. The TTI may be used by an eNB when transmitting a data packet to the UE using communication based on HARQ. As an example, when a short TTI transmission is scheduled and/or transmitted to a receiver (e.g. a UE), from a sender (e.g. an eNB), the receiver may, based on a TTI, determine a HARQ buffer size required for the corresponding size of the data packets. A HARQ buffer size being based on a TTI may pertain to the size being determined based on a TTI and/or a TTI indication and/or a buffer size indication based on a TTI and/or a HARQ process number based on a TTI. In case the TTI is a short TTI, a smaller soft buffer size is expected since the shorter TTI implies a smaller data packet size as described above. The TTI and/or an indication of the TTI and/or the short HARQ process number and/or an identification of the associated HARQ buffer may be signaled from the sender (e.g. an eNB) to the receiver (e.g. a UE). This information may be included in Downlink Control Information (DCI) and/or in a DCI for short TTI (sDCI). Since there are generally fewer TTIs than sizes/alternatives of TB sizes, the adapting/determining of the size of a HARQ buffer based on TTI will imply less complex processing in a UE and thereby the cost and/or complexity of a device and/or the power consumption of the device, is reduced.

Figure 8:
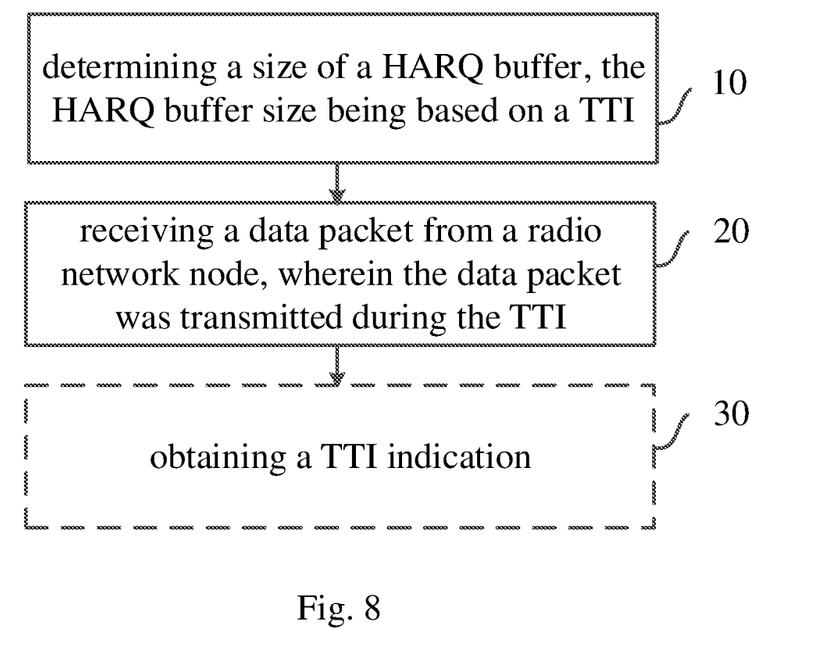
FIG. 8 illustrates a method performed in a wireless device according to embodiments herein.

The above method in a receiver of the HARQ communication, is shown in FIG. 8 and comprises: determining, 10, a HARQ buffer size, the HARQ buffer size being based on a TTI. It may optionally comprise: allocating, 20, the HARQ buffer based on a HARQ process number and/or obtaining, 30, a TTI indication The method is implemented and performed by/in a wireless device, 80 acting as a receiver in a HARQ communication.

Figure 12:
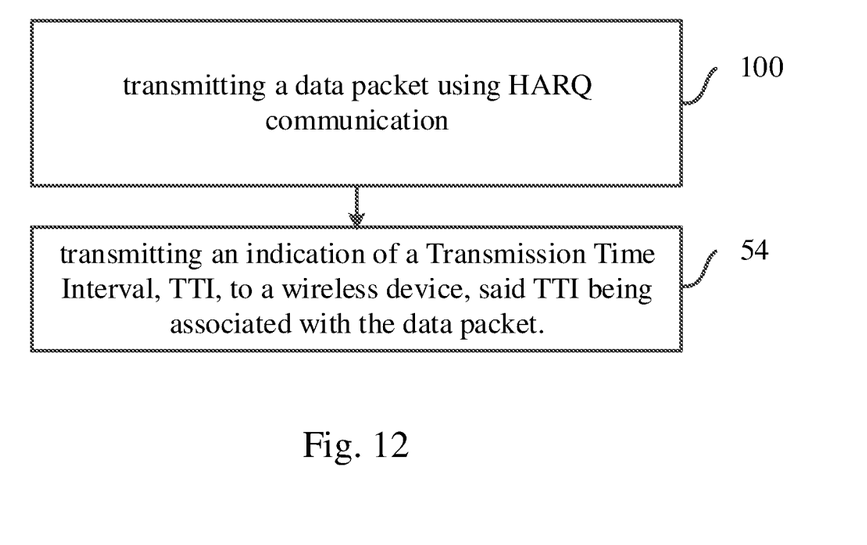
FIG. 12 illustrates a method performed in a radio network node according to embodiments herein.

The corresponding parts of the above method, in a sender of the HARQ communication, is shown in FIG. 12 and comprises: transmitting a data packet using HARQ communication and transmitting an indication of a Transmission Time Interval, TTI, to a wireless device, said TTI being associated with the data packet.

The method is implemented and performed by/in a wireless device acting as a sender in a HARQ communication, e.g. an eNB.

Figure 5:
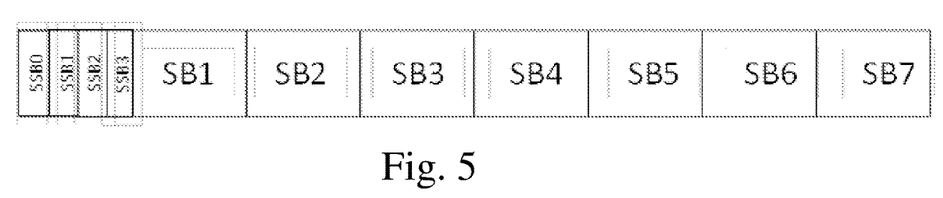
FIG. 5 illustrates soft buffers (HARQ buffers) for short TTIs which are saved in soft buffer (HARQ buffer) SB0 and denoted by SSBx, where x is the short HARQ process number for short TTIs

The receiver (e.g. a UE and/or wireless device) may use this information to determine a HARQ buffer size and/or HARQ buffer allocation for HARQ processes associated with the HARQ buffer. E.g., a UE may have a HARQ buffer allocation as illustrated in FIG. 3. Based on receiving a signaling from a sender (e.g. an eNB), the receiver may e.g. allocate HARQ buffers for associated HARQ processes as illustrated in FIG. 5.

In other words a method for allocating HARQ buffers is disclosed. The method comprises determining a HARQ buffer size, the HARQ buffer size being based on a TTI and the HARQ buffer being associated with a HARQ process.

It should be noted that the total HARQ buffer (see FIGS. 3-7 for different illustrations of how the HARQ buffer can be divided) may be divided into separate HARQ buffers as illustrated in FIG. 3, where a HARQ buffer is represented by SB0 to SB7. Each HARQ buffer may be divided into smaller HARQ buffers (sub-HARQ buffers) as depicted in e.g. FIG. 5, where a smaller HARQ buffer is represented by SSB0 to SSB3. A smaller HARQ buffer has a smaller size (in bits) than a HARQ buffer. A smaller HARQ buffer may be a sub-HARQ buffer. FIGS. 3-7 also illustrates the HARQ buffer allocation, which indicates a relative and/or absolute position of a HARQ buffer within the total HARQ buffer and/or a relative and/or absolute position of a HARQ buffer in relation to other HARQ buffers and/or sub-HARQ buffers. A HARQ buffer may comprise one or more, smaller HARQ buffers and/or sub-HARQ buffers.

In another aspect, a HARQ buffer size is determined and/or allocated to a specific part of the total HARQ buffer based on a HARQ process number. An example is given in relation to FIG. 5, where e.g. four sub-HARQ buffers, SSB0-SSB3, are mapped to the HARQ buffer, SB0, which is associated with long HARQ process 0. This determination and/or allocation may be based on a HARQ process number for a short HARQ process wherein the size of data packets associated with the short HARQ process makes it possible to fit in four different sub-HARQ buffers within one HARQ buffers for a legacy- or long HARQ process. In this manner the HARQ buffers for legacy HARQ processes 1-7 remain unaffected which implies reduced complexity compared to allocating sub-HARQ buffers to different HARQ buffers associated with long or legacy HARQ processes. In addition, if more short HARQ processes are required, another 4 sub-HARQ buffers may be mapped to the HARQ-buffer associated with long HARQ process 1 (SB1). The specific HARQ process' soft buffer memory that is used may be directly determined and/or allocated based on the short HARQ process number. The order within the set of sub-HARQ buffers associated with short HARQ processes that is mapped to the same memory in a given HARQ process, may be predetermined or can be implementation specific.

In yet another aspect, there is disclosed a method for adapting HARQ buffers in a wireless device (90), said device being adapted for HARQ communication, the method comprising determining (10) a size of a HARQ buffer, the HARQ buffer size being based on a TTI. As an option, the method may further comprise receiving (20) a data packet from a radio network node, wherein the data packet was transmitted during the TTI. In this aspect, the data packet may be associated with a HARQ process.

In another aspect the method may optionally comprise allocating the HARQ buffer for the associated HARQ process.

the method may alternatively or additionally comprise obtaining (30) a TTI indication. The TTI indication may be received in a Downlink Control Information, DCI, sent from the radio network node (e.g. an eNB).

The eNB may, when transmitting HARQ data packets, while having active short HARQ processes therefore select a HARQ buffer (e.g. SB1) with an associated HARQ process (HARQ process 1) which does not have any sub-HARQ buffers allocated or has a minimum number of sub-HARQ buffers allocated, when determining the allocation of the HARQ buffer. This is to be able to use the HARQ processes memory for a retransmission attempt without clearing out the stored sub-HARQ buffers.

In another example, a HARQ buffer associated with a HARQ process is determined as a function of the short HARQ process number.

Figure 6:
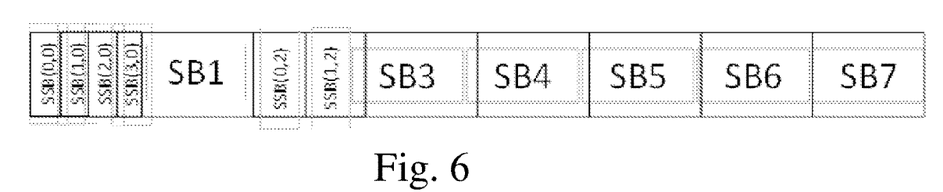
FIG. 6 illustrates soft buffers (sub-HARQ buffers) for TTI lengths of four symbols are saved in soft buffer (HARQ buffer) SB0 and denoted by SB(x,0), where x is the short HARQ process number for TTIs of length four. Soft buffers (sub-HARQ buffer) for TTI lengths of seven symbols are saved in soft buffer (HARQ buffer) SB2, and denoted by SB(y,2), where y is the short HARQ process number for TTIs of length seven. Here we have two separate sets of short HARQ process numbers, one for each possible TTI length.
Figure 7:
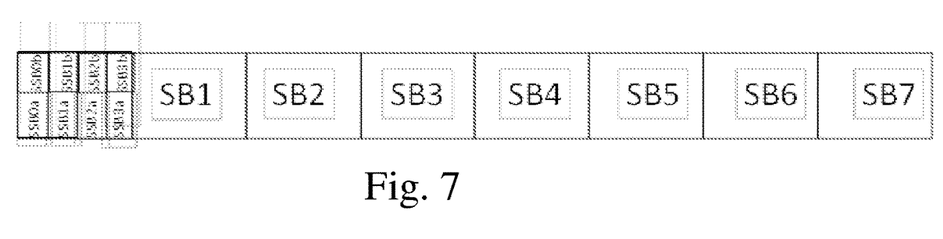
FIG. 7 illustrates soft buffers (sub-HARQ buffers) for short TTIs are saved in the soft buffer SB0 and denoted by SSBxa or SSBxb, where x is the short HARQ process number for short TTIs, and a or b denotes different layers.

In all of the previous examples there can be sub-HARQ buffers of different sizes corresponding to different TTI's. For example, TTIs of length and/or size of four OFDM symbols can be allocated to e.g. HARQ buffer 0 (corresponding to SB0 in FIG. 5) using one of the above approaches, while TTIs of length seven symbols are assigned to buffer 2 using a similar rule. This is illustrated in FIG. 6.

An alternative UE optimized implementation may move around the sub-HARQ buffers associated with short HARQ processes if a potential HARQ buffer allocation happens to overlap with a HARQ buffer associated with an active HARQ process.

An alternative memory handling is that the UE divides its memory in size corresponding to HARQ processes without assigning a specific number to each memory piece. The UE may allocate sub-HARQ buffers within one or multiple HARQ buffers. The remaining HARQ buffers associated with long or legacy HARQ processes may be used unaffected by the short HARQ processes. When all the sub-HARQ processes within a given HARQ process has been ACK:ed, the amount of NACKs has gone beyond the maximum allowed number or they have timed out the HARQ buffers associated with these HARQ processes, can be used to store any given HARQ processes. For example in FIG. 7 if SSB0 to SSB3 has been considered completed by the previous listed steps then the UE can utilize HARQ buffer associated with legacy HARQ process 0 (corresponding to SB0 in FIG. 3) to store any HARQ process. The sender (e.g. an eNB) can utilize a similar function when storing UL HARQ processes in its soft buffer memory as well.

In yet another example there is a fixed mapping with a one-to-one mapping between sub-HARQ buffers associated with short HARQ processes and HARQ buffers associated with long- or legacy HARQ processes. This would allow the sender (e.g. an eNB) to reschedule the HARQ process in either a sTTI (short TTI) or in a longer TTI (e.g. 2 ms TTI), i.e. in other words the scheduling becomes independent from TTI length. This has the benefit that the eNB can always schedule a transmission to the UE, independent on if a longer TTI is more suitable or an shorter TTI length. The feature is applicable both for storing in the UE and storing in the eNB.

In all of the examples and/or aspects above, if the UE is configured to receive more than one layer, the corresponding sub-buffer can be further divided into sub-sub-HARQ buffers where each sub-sub-HARQ buffer is reserved for one of the layers. For an example see FIG. 7.

In the examples given herein are based on that an eNB or a network node is the sender of data packets in the HARQ based communication and that the UE is the receiver of data packets in said HARQ based communication, however it shall be noted that a UE may take a role of a sender and the eNB takes the role of a receiver in a corresponding HARQ based communication. Therefore all the acts performed in a UE, in the above description, may in analogy be performed by an eNB if the UE takes the role of a sender in a HARQ based communication and an eNB takes the role of a receiver in the latter HARQ based communication.

In one aspect, there is disclosed a method for operating a radio network node 80 adapted for transmission of a data packet using HARQ communication, the method comprising transmitting a data packet using HARQ communication, and transmitting an indication of a Transmission Time Interval, TTI, to a wireless device, said TTI being associated with the data packet.

According to examples herein, there is further provided, as disclosed above, a wireless device 90, comprising a processor and a memory, wherein the memory comprises instructions executable by the processor whereby the wireless device 90 is operative to and/or adapted to perform the main steps for operating the wireless device.

In one aspect, a wireless device (90) adapted for HARQ communication, the wireless device comprising a processing circuitry and a memory, said memory containing instructions executable by said processing circuitry, whereby said wireless device is operative to determine a size of a HARQ buffer, the HARQ buffer size being based on a TTI.

In another aspect the wireless device (90) may be further operative to receive a data packet from a radio network node, wherein the data packet was transmitted during the TTI. In one example the data packet may be associated with a HARQ process. As an example, the TTI may be a short TTI, sTTI.

In yet another aspect the wireless device (90) may optionally be operative to allocate the HARQ buffer for the associated HARQ process.

In another aspect the wireless device (90) may be further operative to obtain a TTI indication. In this aspect operative to obtain may comprise operative to receive a Downlink Control Information, DCI.

In another aspect a wireless device (90) adapted for HARQ communication, the wireless device comprising a processing circuitry and a memory, said memory containing instructions executable by said processing circuitry, whereby said wireless device is operative to determine a size of a HARQ buffer, the HARQ buffer size being based on a TTI. The wireless device (90) may be further operative to receive a data packet from an radio network node, wherein the data packet was transmitted during the TTI. The received data packet may be associated with a HARQ process. The size of the HARQ buffer may be determined based on e.g. a TTI size, which may be indicated by the sender (e.g. an eNB). If e.g. a data packet is transmitted in a short TTI, sTTI, the wireless device may determine that the size of the HARQ buffer for the HARQ process associated with the received data packet is smaller than for a received data packet transmitted during a larger TTI. The wireless device (90) is further operative to allocate the HARQ buffer for the associated HARQ process. Allocating the HARQ buffer may comprise reserving a memory in the total HARQ buffer/soft buffer with a specific position and size within the total HARQ buffer.

In another aspect the wireless device (90) may be further operative to obtain a TTI indication. To obtain the TTI indication may include receive a Downlink Control Information, DCI, wherein the DCI may comprise an indication of a TTI used to transmit the data packet.

Figure 9:
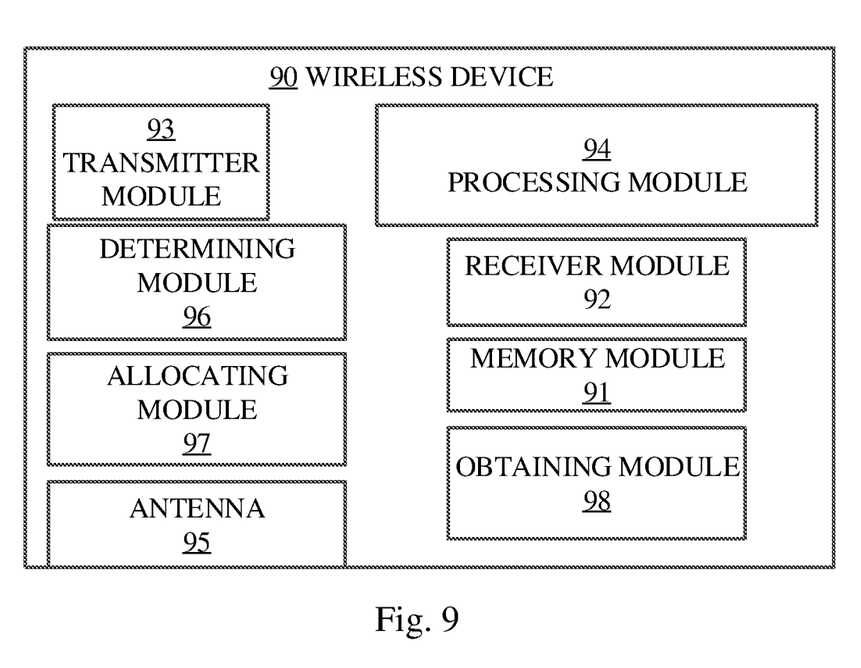
FIG. 9 is a block diagram illustrating a wireless device according to exemplary embodiments herein.

Referring to FIG. 9 there is illustrated a block diagram of exemplary components of a wireless device 90 in accordance with previously disclosed embodiments. The wireless device 90 may comprise a transmitter circuit or transmitter module 93; a receiver circuit or a receiver module 92; a processor 94 or a processing module or processing circuitry; a memory or memory module 91 and may optionally also comprise one antenna 95. The wireless device 90 may also comprise a determining module 96 adapted for determining (10) a size of a HARQ buffer, the HARQ buffer size being based on a TTI, an allocating module 97 adapted for allocating the HARQ buffer for the associated HARQ process and a obtaining module 98 adapted for obtaining (30) a TTI indication.

The antenna 95 may include one or more antennas to transmit and/or receive radio frequency (RF) signals over the air interface. The antenna 95 may, for example, receive RF signals from the transmitter circuit 93 and transmit the RF signals over the air interface to one or more radio network nodes i.e. radio base stations e.g. eNodeBs or eNBs or APs and receive RF signals over the air interface from the one or more radio base stations e.g. eNodeBs or eNBs or APs and provide the RF signals to receiver circuit 92.

Processing module/circuit 94 may include a processing circuitry, microprocessor, an application specific integrated circuit (ASIC), field programmable gate array (FPGA), or the like. Processor circuitry 94 controls the operation of the wireless device 90 and its components. Memory (circuit or module) 91 includes a random access memory (RAM), a read only memory (ROM), and/or another type of memory to store data and instructions that may be used by processor 94. The wireless device 90 may comprise additional components not shown in FIG. 9.

The memory 91 may contain instructions executable by the processor 94 whereby the wireless device 90 is operative to perform the previously described method steps when the wireless device acts as a receiver in a HARQ communication. There is also provided a computer program comprising computer readable code means which when run in the wireless device 90 e.g. by means of the processor 94 causes the wireless device 90 to perform the above described method steps, which include: determining, 10, a HARQ buffer size of a HARQ buffer, the HARQ buffer size being based on a TTI and optionally allocating, 20, the HARQ buffer based on a HARQ process number and/or obtaining, 30, a TTI indication. This may be done by means of the processing module 94, the receiver module 92, the determining module 98, the obtaining module 97 and the allocating module 96.

The memory 91 may also contain instructions executable by the processor 94 whereby the wireless device 90 is operative to perform the previously described method steps when the wireless device acts a sender in a HARQ communication. There is provided a computer program comprising computer readable code means which when run in the wireless device 90 e.g. by means of the processor 94 causes the wireless device 90 to perform the above described method steps, which include: signaling 100 a TTI and/or a short HARQ process number and/or an identification of the associated HARQ buffer, to a second wireless device. This may be done by means of the processing module 94 and the transmitting module 96.

The receiver module 92 is optionally adapted for receiving a data packet from a radio network node, wherein the data packet was transmitted during the TTI and/or receiving a Downlink Control Information, DCI.

Wireless devices, 90, may use any suitable radio access technology, such as long term evolution (LTE), LTE-Advanced, UMTS, HSPA, Global System for Mobile Communication (GSM), cdma2000, WiMax, WiFi, another suitable radio access technology, or any suitable combination of one or more radio access technologies. For purposes of example, various embodiments may be described within the context of certain radio access technologies, such as LTE. However, the scope of the disclosure is not limited to the examples and other embodiments could use different radio access technologies. Each of wireless devices 90 include any suitable combination of hardware and/or software.

Figure 13:
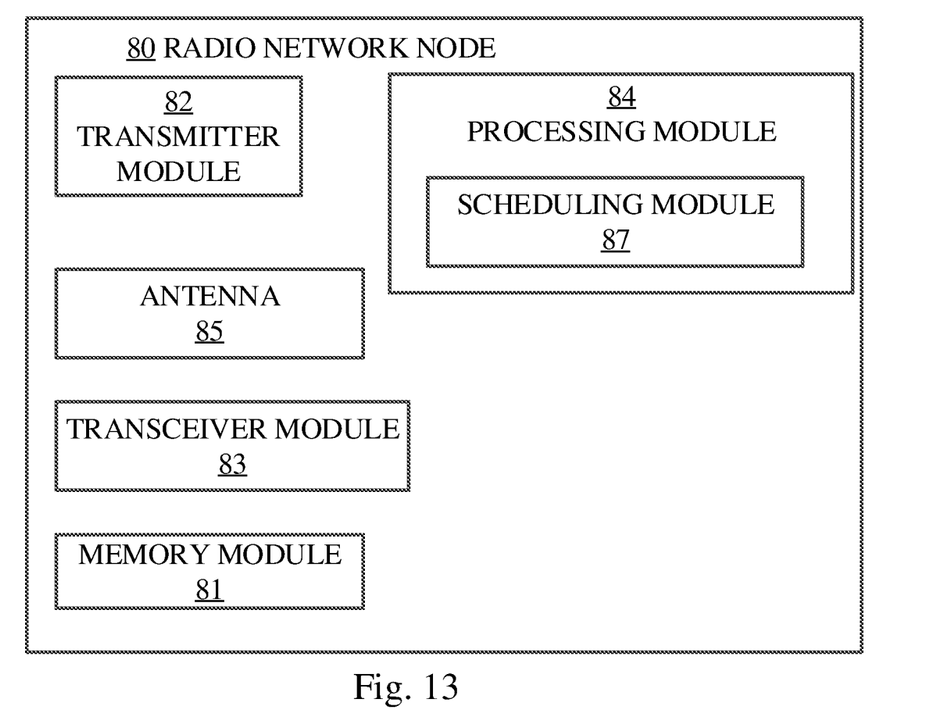
FIG. 13 is a block diagram illustrating a radio network node according to exemplary embodiments herein.

Referring to FIG. 13 there is illustrated a block diagram of exemplary components of a radio network node 80 (e.g. an eNodeB) in accordance with previously disclosed embodiments. The radio network node 80 may comprise a transmitter circuit or transmitter module 82; a receiver circuit or a receiver module 83; a processor 84 or a processing module or processing circuitry; a memory or memory module 81 and may optionally also comprise an antenna 85.

The antenna 85 may include one or more antennas to transmit and/or receive radio frequency (RF) signals over the air interface. The antenna 85 may, for example, receive RF signals from the transmitter circuit 82 and transmit the RF signals over the air interface to one or more radio wireless devices e.g. user equipment and receive RF signals over the air interface from the one or more user equipments and provide the RF signals to receiver circuit 83.

Processing module/circuit 84 may include a processing circuitry, microprocessor, an application specific integrated circuit (ASIC), field programmable gate array (FPGA), or the like. Processor circuitry 84 controls the operation of the radio network node and its components. Memory (circuit or module) 81 includes a random access memory (RAM), a read only memory (ROM), and/or another type of memory to store data and instructions that may be used by processor 84. The radio network node 80 may comprise additional components not shown in FIG. 13.

The memory 81 may contain instructions executable by the processor 84 whereby the radio network node 80 is operative to perform the previously described method steps when the radio network node acts as a transmitter in a HARQ communication. There is also provided a computer program comprising computer readable code means which when run in the radio network node 80 e.g. by means of the processor 84 causes the radio network node 80 to perform the above described method steps, which include: transmitting a data packet using HARQ communication, and transmitting an indication of a Transmission Time Interval, TTI, to a wireless device, said TTI being associated with the data packet. This may be performed by means of the processing module 84, the transceiver module 82.

Thus in one aspect a radio network node 80 adapted for HARQ communication is disclosed. The radio network 80 node comprises a processing circuitry and a memory, said memory containing instructions executable by said processing circuitry whereby said wireless device is operative to transmit a data packet using HARQ communication, and transmit an indication of a Transmission Time Interval, TTI, to a wireless device, said TTI being associated with the data packet.

The memory 91 may also contain instructions executable by the processor 94 whereby the wireless device 90 is operative to perform the previously described method steps when the wireless device acts a sender in a HARQ communication. There is provided a computer program comprising computer readable code means which when run in the wireless device 90 e.g. by means of the processor 94 causes the wireless device 90 to perform the above described method steps, which include: signaling 100 a TTI and/or a short HARQ process number and/or an identification of the associated HARQ buffer, to a second wireless device. This may be done by means of the processing module 94 and the transmitting module 96.

Figure 10:
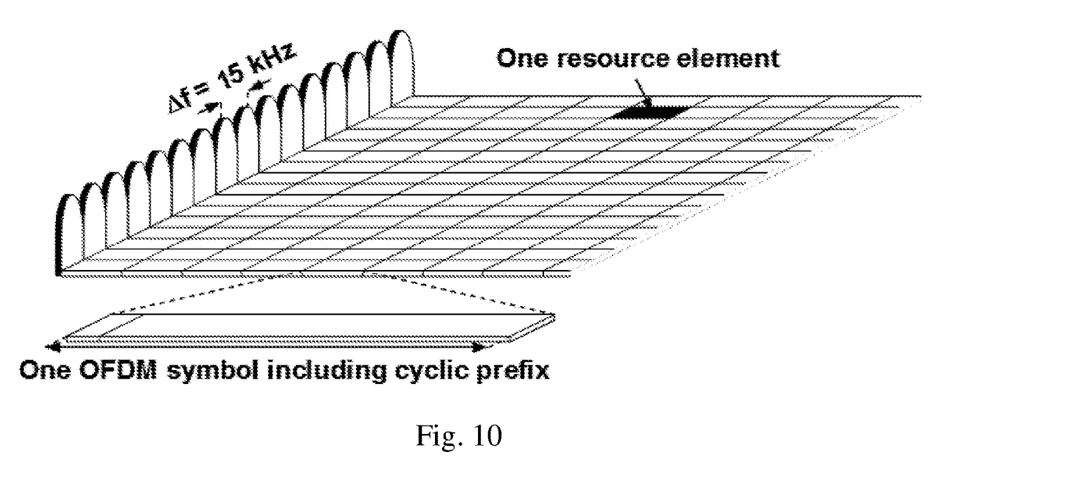
FIG. 10 illustrates an example of an LTE downlink physical resource.

LTE uses OFDM in the downlink and DFT-spread OFDM in the uplink. The basic LTE downlink physical resource can thus be seen as a time-frequency grid as illustrated in FIG. 10, where each resource element (RE) correspond to one OFDM subcarrier during one OFDM symbol interval.

Figure 11:
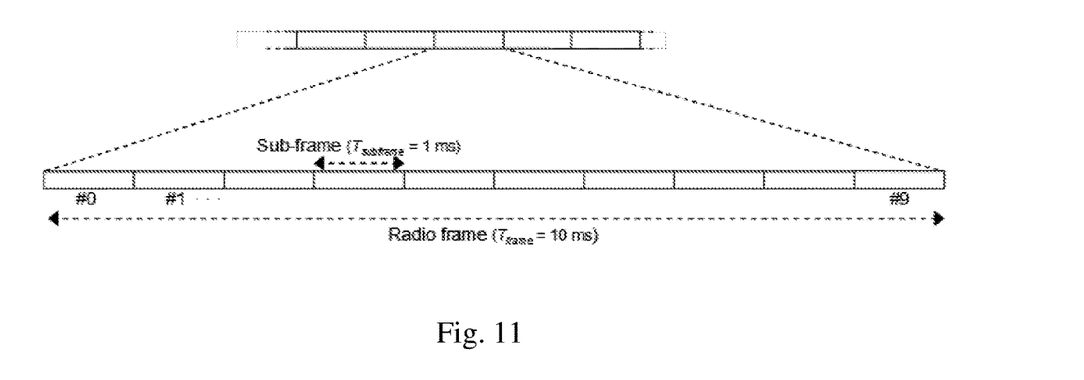
FIG. 11 illustrates an example of an LTE time-domain (frame) structure.

In the time domain, LTE downlink transmissions are organized into radio frames of 10 ms, each radio frame consisting of ten equally-sized subframes of length Tsubframe=1 ms, as illustrated in FIG. 11. A subframe may be divided in two equal parts, wherein each equal part is called a slot. For normal cyclic prefix, one subframe consists of 14 OFDM symbols. The duration of each OFDM symbol is approximately 71.4 µs.

Furthermore, the resource allocation in LTE is typically described in terms of resource blocks, RB, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Determining a HARQ buffer size may comprise allocating and/or reserving a memory area for an associated HARQ process, wherein the memory area is suitable for storing digital data (e.g. RAM, FPGA, cache, flash).

A HARQ buffer allocation may pertain to the absolute and/or relative position of the HARQ buffer within the total HARQ buffer. A HARQ buffer allocation may also pertain to its relative and/or absolute position in relation to other HARQ buffers and/or sub-HARQ buffers.

A HARQ buffer size being based on a TTI may pertain to the size being determined based on a TTI and/or a TTI indication and/or a buffer size indication based on a TTI and/or a HARQ process number based on a TTI.

Transmitting in this disclosure may pertain to scheduling and/or sending and/or coding and/or multiplexing.

Receiving may comprise decoding and/or de-multiplexing.

A legacy- or long TTI may be considered a prior art TTI of e.g. 2 ms. A short TTI may be considered a TTI representing a shorter time interval than a legacy- or long TTI.

A HARQ process being associated with a HARQ buffer may comprise that the HARQ buffer stores data packets only related to HARQ transmissions for said HARQ process. An association between a HARQ process and a HARQ buffer may be created by associating a HARQ process number with a HARQ buffer.

An active HARQ process may pertain to a HARQ transmission with non-acknowledged data packets in its HARQ buffer.

A HARQ process number is a unique identity among active HARQ processes for a HARQ communication between two devices.

A HARQ buffer is said to overlap with another HARQ buffer if at least a part of a HARQ buffer is common for both buffers.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP and IEEE802.11EEE has been used in this disclosure to exemplify the invention, this should not be seen as limiting the scope of the invention to only the aforementioned system. Other communication systems, including LTE or LTE-A (LTE-Advanced) and WiMax may also benefit from exploiting the ideas covered within this disclosure.

The invention claimed is:

1. A method of operation by a wireless device configured for operation in a wireless communication network, the method comprising:

running individual Hybrid Automatic Repeat reQuest (HARQ) processes for receiving respective data packets transmitted for the wireless device, up to some maximum number of concurrent HARQ processes, each HARQ process supported by a corresponding HARQ buffer that is sized in dependence on a Transmission Time Interval (TTI) length associated with the respective data packet; and allocating the corresponding HARQ buffers dynamically, from a total HARQ buffer of the wireless device, the total HARQ buffer having a first level of subdivision defining a first set of first HARQ buffers, each first HARQ buffer sized for a first TTI length, said allocating including:

allocating corresponding HARQ buffers for HARQ processes associated with the first TTI length by allocating available HARQ buffers from among the first set of first HARQ buffers; and allocating corresponding HARQ buffers for HARQ processes associated with TTI lengths shorter than the first TTI length by allocating available HARQ buffers from among one or more further sets of further HARQ buffers, each further set of further HARQ buffers sized to support a particular TTI length and formed by dynamically subdividing an available first HARQ buffer using a level of subdivision dependent on the particular TTI length; and wherein allocating corresponding HARQ buffers for HARQ processes associated with TTI lengths shorter than the first TTI length comprises, for each such HARQ process, allocating an available further HARQ buffer, in a case where one or more further HARQ buffers of a correct HARQ buffer size are available, and, in a case where no further HARQ buffers of the correct HARQ buffer size are available, dynamically forming a further set of further HARQ buffers of the correct HARQ buffer size by subdividing an available first HARQ buffer.

2. The method of claim 1, further comprising, responsive to no further HARQ buffers in a particular further set of HARQ buffers being in use, deallocating the particular further set of HARQ buffers, for reallocation of the first HARQ buffer used to form the particular further set of further HARQ buffers, either for use with a HARQ process associated with the first TTI length or for use with one or more HARQ processes associated with a particular TTI length shorter than the first TTI length.

3. The method of claim 1, further comprising receiving TTI indications in Downlink Control Information (DCI) transmitted by a radio network node of the wireless communication network, the TTI indications indicating TTI lengths for respective data packets.

4. The method of claim 1, wherein the first TTI length is a longest TTI length among two or more TTI lengths usable for transmitting to the wireless device.

5. A wireless device configured for operation in a wireless communication network, the wireless device comprising:

transmitter and receiver circuits configured to transmit signals to and receive signals from radio network nodes of a wireless communication network; and processing circuitry operatively associated with the transmitter and receiver circuits and configured to:

run individual Hybrid Automatic Repeat reQuest (HARQ) processes for receiving respective data packets transmitted for the wireless device, up to some maximum number of concurrent HARQ processes, each HARQ process supported by a corresponding HARQ buffer that is sized in dependence on a Transmission Time Interval (TTI) length associated with the respective data packet; and allocate the corresponding HARQ buffers dynamically, from a total HARQ buffer of the wireless device, the total HARQ buffer having a first level of subdivision defining a first set of first HARQ buffers, each first HARQ buffer sized for a first TTI length;

wherein, to allocate the corresponding HARQ buffers dynamically, the processing circuitry is configured to:

allocate corresponding HARQ buffers for HARQ processes associated with the first TTI length by allocating available HARQ buffers from among the first set of first HARQ buffers; and allocate corresponding HARQ buffers for HARQ processes associated with TTI lengths shorter than the first TTI length by allocating available HARQ buffers from among one or more further sets of further HARQ buffers, each further set of further HARQ buffers sized to support a particular TTI length and formed by dynamically subdividing an available first HARQ buffer using a level of subdivision dependent on the particular TTI length; and wherein the processing circuitry is configured to allocate corresponding HARQ buffers for HARQ processes associated with TTI lengths shorter than the first TTI length by, for each such HARQ process, allocating an available further HARQ buffer, in a case where one or more further HARQ buffers of a correct HARQ buffer size are available, and, in a case where no further HARQ buffers of the correct HARQ buffer size are available, dynamically forming a further set of further HARQ buffers of the correct HARQ buffer size by subdividing an available first HARQ buffer.

6. The wireless device of claim 5, wherein the processing circuitry is configured to respond to no further HARQ buffers in a particular further set of HARQ buffers being in use by deallocating the particular further set of HARQ buffers, for reallocation of the first HARQ buffer used to form the particular further set of further HARQ buffers, either for use with a HARQ process associated with the first TTI length or for use with one or more HARQ processes associated with a particular TTI length shorter than the first TTI length.

7. The wireless device of claim 5, wherein the processing circuitry is configured to receive TTI indications in Downlink Control Information (DCI) transmitted by a radio network node of the wireless communication network, the TTI indications indicating TTI lengths for respective data packets.

8. The wireless device of claim 5, wherein the first TTI length is a longest TTI length among two or more TTI lengths usable for transmitting to the wireless device.

* * * * *